United States Patent [19]

Louzil

[11] 4,413,732
[45] Nov. 8, 1983

[54] CASSETTE AND ADAPTER COMBINATION
[75] Inventor: Friedrich Louzil, Vienna, Austria
[73] Assignee: U.S. Philips Corporation, New York, N.Y.
[21] Appl. No.: 71,224
[22] Filed: Aug. 30, 1979
[30] Foreign Application Priority Data
  Sep. 4, 1978 [AT] Austria .................................. 6386/78
[51] Int. Cl.³ .......................................... B65D 85/672
[52] U.S. Cl. ............................................ 206/387
[58] Field of Search ............... 206/387, 485; 224/312; 312/10, 12; 211/40

[56] References Cited
U.S. PATENT DOCUMENTS
4,203,519 5/1980 Fujitaki ............................... 206/387
4,240,551 12/1980 Osanai ................................ 206/387
4,285,554 8/1981 Bell et al. ............................ 206/387

FOREIGN PATENT DOCUMENTS
1289153 10/1969 United Kingdom .
1427568 3/1973 United Kingdom .

Primary Examiner—Joseph Man-Fu Moy
Attorney, Agent, or Firm—David R. Treacy

[57] ABSTRACT

The combination of a cassette such as a magnetic tape cassette, and a detachable U-shaped bracket having two limbs which engage the two side walls of the cassette. In a first position of interconnection, the bracket crosspiece is remote from the cassette front wall, and the bracket functions as an adapter permitting use of this cassette in an apparatus intended for a larger cassette. When interconnected in the other relative position, the bracket crosspiece closes the front wall of the cassette housing to cover over the tape access opening.

13 Claims, 6 Drawing Figures

CASSETTE AND ADAPTER COMBINATION

BACKGROUND OF THE INVENTION

The invention relates to a cassette for a record carrier in the form of a tape, and a bracket for the cassette; and more particularly to the combination in which the cassette has a substantially rectangular cassette housing constituted by two cover walls, two side walls, a rear wall and a front wall with at least one opening, along which the record carrier is passed and through which opening it is accessible; the bracket which is detachably connectable to the cassette housing, is U-shaped comprises two limbs and one cross-piece interconnecting these two limbs, the limbs engaging the two side walls of the cassette housing and including a retaining device which acts between the cassette housing and the bracket for retaining the cassette housing and the bracket to each other. Such a cassette is known from German Patent application No. 19 54 735, to which British Pat. No. 1,289,153 corresponds. In this cassette the bracket has an adapter function, enabling the cassette to be used in different types of apparatus. The bracket can then be connected to the cassette housing by means of a clamped connection, which is for example constituted by two resilient projections of the bracket.

SUMMARY OF THE INVENTION

It is the object of the invention to extend the application possibilities of a bracket of a cassette as mentioned in the preamble and furthermore to provide a reliable connection between the bracket and the cassette housing. To this end a cassette in accordance with the invention is characterized in that the cassette housing and the bracket can be connected to each other in a first position relative to each other, in which the front wall of the cassette housing is remote from the cross-piece of the bracket and the cassette thus formed is ready for operation, as well as in a second position of said parts relative to each other, in which the front wall of the cassette housing faces the cross-piece of the bracket and the bracket protects said front wall, and that the retaining device for retaining the cassette housing and the bracket to each other in both positions is constituted by at least one double-acting latching device, which comprises primary and secondary latching elements which are arranged on the cassette housing and on the bracket and which engage with each other.

Thus it is ensured in a particularly simple manner and without the use of separate aids that, depending on the position in which it is connected to the cassette housing, the bracket, in addition to an adapter function for modifying the size of the cassette, also performs the function of protecting the front wall of the cassette and the record carrier at the location of this front wall, where it is accessible through the opening therein, which is of importance in the case of transport, storage, filing etc. of a cassette. Thus a separate container, such as a cover or a box for the cassette may be dispensed with, because the combination provides satisfactory protection in particular for the entire front wall of the cassette housing and the record carrier which is accessible at the location of said wall, which yields an appreciable saving. As is known, such a protection is very important, because especially damage at the location of the front wall of the cassette housing, where in general vulnerable positioning elements for the cassette housing and guides and pressure devices for the record carrier are disposed, or damage to the record carrier itself may lead to an incorrect operation during use of the cassette. Obviously, the bracket of such a cassette in accordance with the invention may also be used solely as a detachable protection device for exposing or closing the cassette wall in which an opening is formed, without having an adapter function. Furthermore, it is to be noted that the use of the double-acting latching device in a particularly simple manner ensures that the bracket is reliably connected to the cassette housing in both positions relative to the cassette.

A particularly simple construction is obtained when the double-acting latching device for retaining the cassette housing and the bracket to each other comprises only one primary latching element on one of these two parts and two secondary latching elements on the other part, which secondary elements are arranged at a distance from each other in accordance with the location of the primary latching element in the two relative positions. Thus it is achieved that the double-acting latching device comprises a minimum number of latching elements.

Furthermore, it is found to be advantageous if the one primary latching element is constituted by a projection formed on a wall of a limb of the bracket, which wall faces the cassette housing, and if the two secondary latching elements are constituted by two recesses formed in the side wall of the cassette housing which faces the relevant limb. This results in a cassette in which the risk of the latching elements of the double-acting latching devices being damaged in the disassembled condition of the bracket and cassette housing is substantially eliminated.

In another particularly advantageous embodiment each of the walls of the two limbs of the bracket which face the cassette housing includes a ridge which extends along the respective limb, and each of the two side walls of the cassette housing includes a groove is formed for cooperation with the ridge on the adjacent limb, and if the primary latching elements and the secondary latching elements of the double-acting latching device are arranged on one of the two ridges and in the slot which cooperates with the ridge. This yields a cassette which enables the bracket and cassette housing to be assembled in a particularly simple and reliable manner, because the cooperation between the ridges and the slots provides exact guidance between the two parts. Furthermore, the cooperation between the ridges and the slots prevents the cassette housing from inadvertently being pushed out of the cassette housing in a direction perpendicular to the cover walls of the cassette housing.

A particularly advantageous embodiment of the cassette in accordance with the invention is characterized in that when the front wall of the cassette is non-planar, the shape of that wall of the cross-piece of the bracket which faces the cassette housing is adapted to be complementary to the shape of the front wall of the cassette housing and that in the second position when the cassette housing is connected to the bracket the double-acting latching device retains these two parts in a position in which the two walls of complementary shape engage with each other, the wall of the cross-piece closing the opening formed in the front wall of the cassette housing. This provides an optimum protection both for the front wall in which the opening is formed and for the record carrier which is accessible through said opening when the cassette housing is connected to the bracket in the second position. A cassette which is thus protected may readily be dispatched, for example in a letter, and may also be stored or kept on file for a prolonged time without any adverse effect on the operation of the cassette, for example owing to dust or soiling.

In this respect it is furthermore found to be advantageous if the bracket comprises an index strip for marking, making notes and the like at least on a wall which is free relative to the cassette housing. This enables the bracket to be provided with an identification which may for example concern the content of the recording on the record carrier, the user of the cassette, the recipient of the cassette etc.. Suitably, the index strip may be arranged on such a wall of the bracket that the index strip also remains visible when a plurality of cassettes are stored or filed adjacent each other, so that the marks or identifications on said strip then also remain readable.

Furthermore, it is found to be particularly advantagous when on at least one wall which is free relative to the cassette housing the bracket is provided with an identification code constituted by a plurality of code elements and when there is provided at least one slide which is movable along that wall for selection of the code elements. This enables marking by means of devices already provided on the bracket, without the necessity of additional separate aids such as a marking pen or a stylus. In this case it is merely necessary for all persons working with such a cassette to lay down a coding and encoding system for the relevant identification code. Such an identification may also be modified in a simple manner.

In this respect it is found to be advantageous when the slide is U-shaped and, enclosing the bracket with its free ends, is movably guided along the wall of said bracket which is provided with the identification code, and if there is provided a latching device for the slide which comprises a plurality of latching positions, these latching positions being associated with the code elements. Thus, by means of a very simple construction it is achieved that the slide is accurately guided and is also accurately retained in any selected position.

The invention is described in more detail with reference to the drawings which show two embodiments to which it is not limited.

DESCRIPTION OF THE PREFERRED EMBODIMENTS

Figure 1:
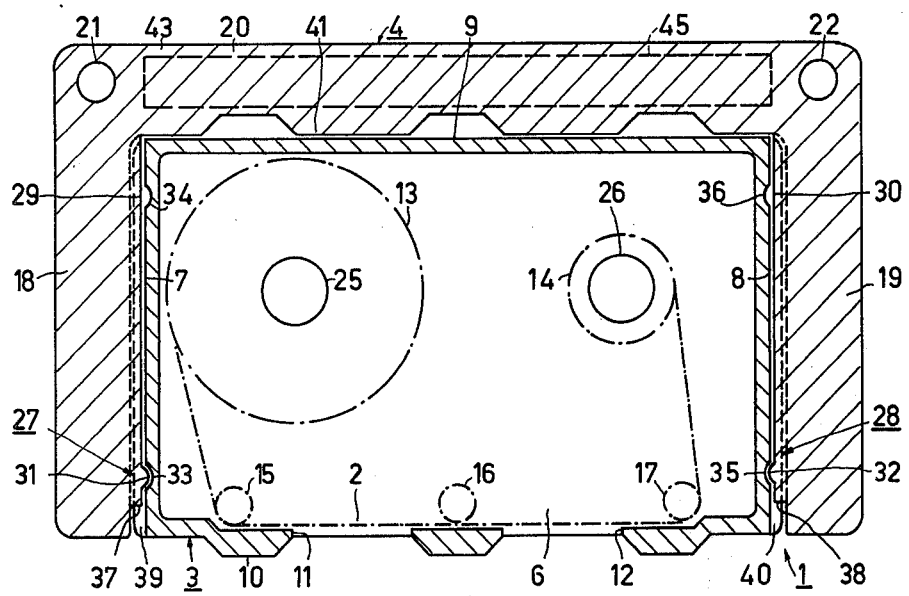
FIG. 1 is a sectional view of a cassette in its operating position, the double-acting latching device acting between the side walls of the cassette housing and the limbs of the bracket.
Figure 2:
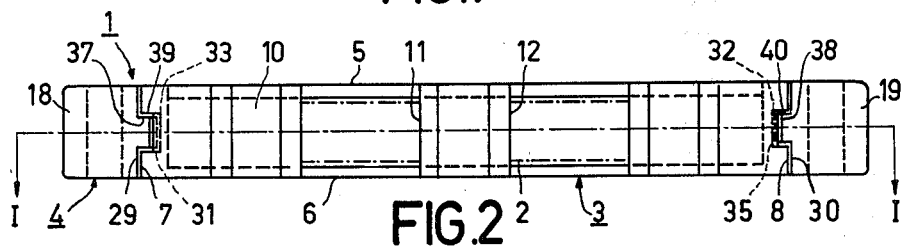
FIG. 2 is a front view of the cassette of FIG. 1.
Figure 3:
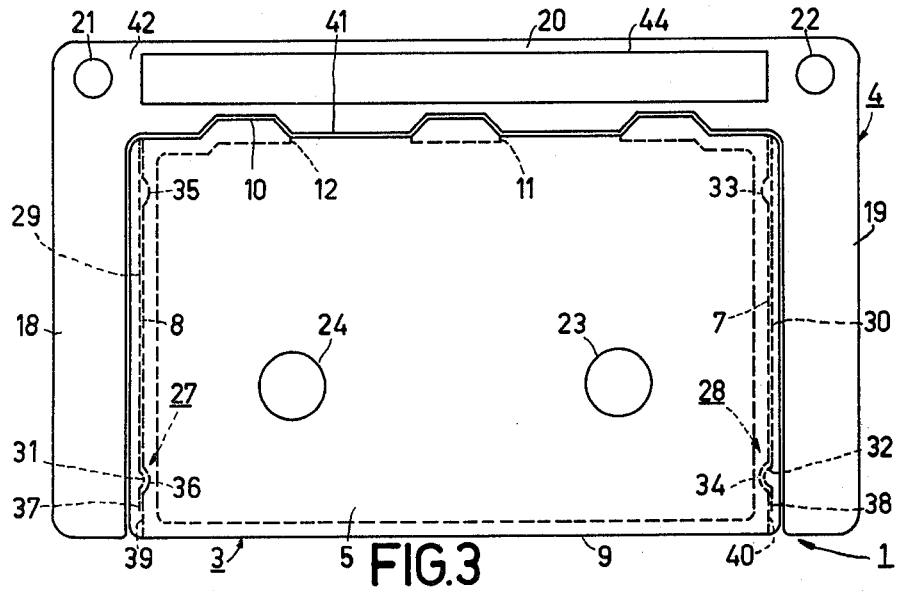
FIG. 3 is a plan view of the cassette of FIGS. 1 and 2, the bracket being in that position relative to the cassette housing in which it performs its protective function.

FIG. 1 to 3 show a cassette 1 for a record carrier 2, which in FIGS. 1 and 2 is symbolically represented by dash-dot lines. The cassette 1 comprises a substantially rectangular cassette housing 3 and a U-shaped bracket 4 which is detachably connected to the cassette housing 3.

The cassette housing 3 comprises two cover walls 5 and 6, two side walls 7 and 8, a rear wall 9 and a nonplanar front wall 10, in which two openings 11 and 12 are formed. In the cassette housing 3 the record carrier 2 is passed from a first roll 13 to a second roll 14 by means of three drive rollers or drive pins 15, 16 and 17, which are also symbolically represented by dash-dot lines, along the front wall 10 in which the openings 11 and 12 are formed, so that the record carrier is accessible through the two openings 11 and 12. In this way scanning elements, such as magnetic recording and/or playback heads or magnetic erase heads, can cooperate with the record carrier 2 through the openings.

The bracket 4 comprises two limbs 18 and 19 and a cross-piece 20 interconnecting these two limbs, the bracket engaging with the two side walls 7 and 8 of the cassette housing 3 with its two limbs 18 and 19. In order to retain the cassette housing 3 and the bracket 4 to each other there is provided a latching device between the two parts, which is described in more detail hereinafter.

In the position of the bracket 4 relative to the cassette housing 3, as shown in FIGS. 1 and 2, in which position the cross-piece 20 of the bracket 4 engages with the rear wall 9 of the cassette housing 2 so that the front wall 10 of the cassette housing is exposed and the cassette is thus ready for operation, the bracket has an adapter function for changing the size of the cassette, so as to enable the cassette to be adapted to different types of apparatus. The operative cassette, which is constituted by the cassette housing and the bracket, may be inserted in a first type of apparatus having a cassette holder which is adapted to the dimensions of the cassette. In this holder the cassette is positioned in its operating position, for example with the aid of locating pins on the apparatus, which engage with the two bores 21 and 22 formed in the bracket 4. For driving the two rolls 13 and 14 drive means on the apparatus are adapted to cooperate with the rolls 13, 14 in known manner, not shown, via openings 23, 24 (FIG. 3) and 25, 26 (FIG. 1) respectively formed in each of the two cover walls 5 and 6. However, when the bracket 4 and the cassette housing 3 are separated from each other, the cassette housing itself may be inserted into a second type of apparatus, having a cassette holder which is adapted to the dimensions of the cassette housing. The rolls 13 and 14 are then also driven by drive means provided on the apparatus, which again cooperate with the rolls through the said openings 23, 24 and 25, 26 formed in the cover walls 5 and 6 respectively. For positioning the cassette housing in its operating position openings may for example be formed at the front 10 of the cassette housing 3, which again cooperate with corresponding locating pins on the apparatus, but for the sake of clarity this is not shown.

However, the cassette housing 3 and the bracket 4 cannot only be connected to each other in the first position relative to each other, shown in FIGS. 1 and 2, in which the front wall 10 of the cassette housing 3 is remote from the cross-piece 20 of the bracket 4 and in which the cassette thus formed is ready for operation, but also in a second position relative to each other, shown in FIG. 3, in which the front wall 10 of the cassette housing 3 faces the cross-piece 20 of the bracket 4 and the bracket 4 then protects the front wall.

For retaining the cassette housing 3 and the bracket 4 to each other in both relative positions, two double-acting latching devices 27 and 28 are used as retaining device, which latching devices comprise engaging primary and secondary latching elements on the cassette housing 3 and on the bracket 4. In order to obtain a simple construction each of the double-acting latching devices 27 and 28 for retaining the cassette housing and the bracket to each other is constructed so that one of these two parts comprises only one primary latching element and the other part comprises two secondary latching elements, which are arranged at a distance from each other in accordance with the location of the primary latching element two relative positions. As is evident from FIGS. 1 to 3, the one primary latching element of each latching device 27 to 28 is constituted by a projection 31 or 32 on that wall 29 or 30 of a limb 18 or 19 of the bracket 4, which faces the cassette housing 3. The two secondary latching elements of each latching device 27 or 28 are then constituted by two recesses 33, 34 and 35, 36 respectively formed in that side wall 7 and 8, respectively of the cassette housing 3, which faces the relevant limbs 18 and 19. It is obvious that recesses may also be used as primary latching elements and projections as secondary latching elements. Similarly, the latching devices may comprise latching elements, such as balls, keys or the like, provided with separate springs.

As is furthermore apparent from FIGS. 1 to 3 there is provided a ridge 37 or 38 which extends along the relevant limb 18 or 19 on these walls 20 and 30 of the two limbs 18 and 19 of the bracket 4 which face the cassette housing 3. Furthermore a groove 39 or 40 is formed in each of the two side walls 7 and 8 of the cassette housing 3 for cooperation with the ridge 37 or 38 on the adjacent limb 18 or 19. The primary latching elements of the two double-acting latching devices 27 and 28, which elements take the form of projections 31 and 32, are then arranged on the two ridges 37 and 38. The secondary latching elements of the two latching devices, which elements are formed by the recesses 33, 34 and 35, 36, are then formed by the slots 39 and 40 which cooperate with the ridges 37 and 38.

Especially FIG. 3 clearly shows that the shape of that wall 41 of the cross-piece 20 of the bracket 4 which faces the cassette housing 3 is the mirror image of the shape of the front wall 10 of the cassette housing 3. When the bracket 4 is connected to the cassette housing 3 in the second relative position the two double-acting latching devices 26 and 28, because of their shape and arrangement, then retain these two parts in the position shown in FIG. 3, in which the two walls 10 and 41 of complementary shape engage with each other, the wall 41 of the cross-piece 20 of the bracket 4 closing the openings 11 and 12 formed in the front wall 10 of the cassette housing 3.

Furthermore it is to be noted that in the case of the present cassette the bracket 4, on those walls 42 and 43 of the cross-piece 20 which are free from the cassette housing and which extend parallel to the cover surfaces 5 and 6 of the cassette housing 3, carries an index strip 44 and 45 respectively for making marks, notes and the like.

In addition to an adapter device for changing the size of the cassette the bracket, as is apparent from the foregoing, constitutes a protection device for the cassette, which protects the front wall of the cassette housing and thus the record carrier which is accessible through the openings at the location of said front wall. The protective function is then obtained by simply reversing the bracket relative to the cassette housing, which can be realized by a very simple operation, which may be further simplified in that through the cooperation of the ridges on the limbs of the brackets and the slots in the side walls of the cassette housing an exact guidance between these two parts is obtained which is active during disassembly and assembly respectively. In the assembled condition of these two parts the ridges and slots in addition ensure that the cassette housing cannot inadvertently be pressed out of the bracket in a direction which extends perpendicularly to the cover walls of the cassette housing. Thus, without a separate protective container, such as cover, a box and the like, a satisfactory protection is obtained for the cassette housing and in particular for its front wall. The latching devices then have the advantage that they are particularly simple and reliable. By the arrangement of the latching elements of the latching devices on the ridges on the inner side of the bracket and within the slots in the side walls of the cassette housing, an optimum protection is obtained against damaging of said latching elements. A further important advantage is the complementary adaptation of the front wall of the cassette housing and that wall of the cross-piece of the bracket which faces the cassette housing, because in this way the openings formed in the front wall can be closed in a satisfactory manner, so that also during transport or despatch of the cassette and storage or filing of this cassette damaging, settling of dust or soiling of in particular the record carrier through the openings in the front wall of the cassette housing is prevented. As it is always effective during use, transport and storage of the cassette to provide said cassette with an identification, an instruction or the like relating to the content of the recording on the record carrier, the user of the cassette, the recipient of the cassette or the use of the cassette etc., it may be regarded as advantageous that the bracket is provided with an index strip on which, independently of whether the cassette is in its operative or in its protected condition, corresponding marks can be made and read.

Figure 4:
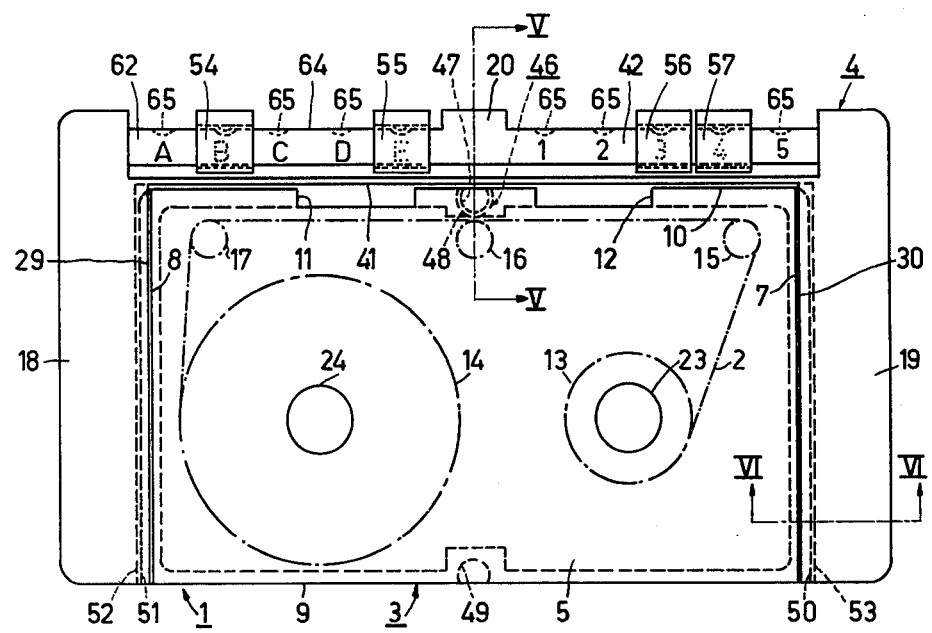
FIG. 4 is a plan view of another cassette with the cassette housing in the protected position, the double-acting latching device acting between the rear wall or front wall of the cassette housing and the cross-piece of the bracket.
Figure 5:
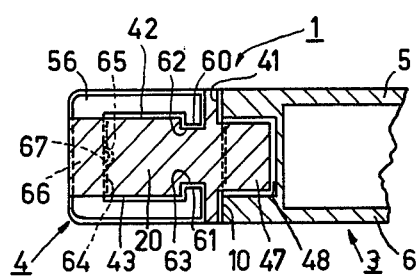
FIG. 5, on an enlarged scale relative to FIG. 4, is a cross-section through a detail of the cassette shown in FIG. 4 taken on the line V—V of FIG. 4.
Figure 6:
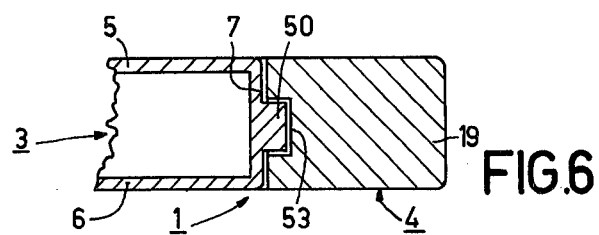
FIG. 6, also on an enlarged scale relative to FIG. 4, is a cross-sectional view through a further detail of said cassette, taken on the line VI—VI in FIG. 4.

FIGS. 4 to 6 show an embodiment of a cassette 1 in accordance with the invention, which comprises only one double-acting latching device 46, which takes the form of a button-like snap connection. The latching device 46 comprises a primary latching element an essentially cylindrical projection 47 on that wall 41 of the cross-piece 20 of the bracket 4 which faces the cassette housing 3, the axis of said projection extending transversely to the cover walls 5 and 6 of the cassette housing, and as secondary latching elements two corresponding essentially cylindrical recesses 48 and 49, of which one reccess is formed in the front wall 10 and the other in the rear wall 9 of the cassette housing 3. This again ensures that the bracket 4 and the cassette housing 3 are reliably retained to each other both in the first and in the second position of the parts relative to each other. In the second relative position in FIG. 4, to which the bracket 4 has a protective function, the front wall 10 of the cassette housing 3 is again protected by the cross-piece 20 of the bracket 4.

In the present embodiment there is further disposed a ridge 50 or 51 on each respective side wall 7 or 8 of the cassette housing 3, which serves for cooperation with each of the grooves 52 and 53 formed on the walls 29 and 30, which walls face the cassette housing, of the limbs 18 and 19 of the bracket 4. This detail is shown in FIG. 6. Thus, a guidance is obtained again between the bracket 4 and the cassette housing 3, which facilitates the assembly of the two parts in their two positions relative to each other and which at the same time prevents the cassette housing from inadvertently being pushed out of the bracket in a direction transverse to the cover walls 5 and 6 of the cassette housing.

As can be seen in FIGS. 4 and 5, the bracket 4 is provided with an identification code, formed by a plurality of code elements, on the wall of the cross-piece 20 which is free relative to the cassette housing and which extends parallel to the cover walls 5 and 6 of the cassette housing 3. In the present case the code elements consist of the capital letters A, B, C, D and E and of the digits 1, 2, 3, 4 and 5. For the selection of the code elements there are provided four slides 54, 55, 56 and 57 which are movable along said wall 42 of the cross-piece 20. The slides 54, 55, 56 and 57 are made of an opaque material, so that said selection of the code element is effected by placing the slide over a code element that is not desired, thus covering said element. In this way a code combination may be selected, as is for example represented by the combination ACD 125 in FIG. 4. If for the user of such cassettes a coding and decoding system is laid down, a wide variety of information can thus be set and read with the aid of the identification code. This enables the cassettes to be provided with an identification in a simple manner, which identification can also readily be changed without the need for separate aids. If the slides are for example made transparent, it is obviously also possible to stipulate that the code elements covered by the slides indicate the desired code combination. Similarly, a different number of slides or digits only or letters only may be chosen as code elements.

As is shown in particular in FIG. 5, the slides 54, 55, 56 and 57 are U-shaped. Each of the slides is movable guided along that wall 42 of the cross-piece which is provided with the identification code, engaging with the cross-piece 20 of the bracket 4 with its free ends 58 and 59. Each free end 58 and 59 of each slide is provided with an angular projection 60 and 61 respectively, which engages in a guide slot 62 and 63 respectively formed in the two walls 42 and 43 of the cross-piece 20 of the bracket 4 and extending along the cross-piece. Furthermore, there is provided a latching device with a plurality of latching positions for each slide, whose latching positions correspond to the code elements. The latching device comprises a plurality of recesses 65 formed in that wall 64 of the cross-piece 20 which is remote from the cassette housing and projections 67 formed in the basic part 66 of each slide.

As is apparent from the foregoing, a series of further modifications to the embodiments described are possible, in particular in respect of the construction of the latching device, the arrangement of the index strips or the provision of a corresponding identification code.

What is claimed is:

1. In combination, a cassette for a record carrier in the form of a tape, comprising a cassette housing having two cover walls, two side walls and a front wall having at least one opening, the record carrier tape passing along and being accessible through said opening, a U-shaped bracket comprising two limbs and one cross piece interconnecting said two limbs, arranged to be detachably connected to the cassette housing by engagement of said two limbs with the two side walls of the cassette housing, and retaining means acting between the cassette housing and the bracket for retaining the cassette housing and the bracket to each other, characterized in that the cassette housing and the bracket are arranged to be connectable to each other in a first position relative to each other, in which the front wall of the cassette housing is remote from the bracket cross piece, the cassette-bracket combination thereby being positionable in an apparatus by locating with respect to the bracket, at the same time that the front wall opening is accessible for scanning of the tape; as well as in a second relative position in which the cassette housing front wall faces the bracket cross piece such that the bracket cross piece protects said front wall, and said retaining means comprise at least one double-acting latching device having primary and secondary latching elements arranged on the cassette housing and on the bracket, engageable with each other.

2. A combination as claimed in claim 1, characterized in that the double-acting latching device is operable between a bracket limb and a cassette side wall, and comprises one primary latching element only on one of said housing and limb and two secondary latching elements on the other of said housing and limb, said secondary elements being spaced from each other a distance in accordance with the location of the primary latching element in the two relative positions of the bracket and cassette.

3. A cassette as claimed in claim 2, characterized in that the bracket limb has a wall facing the cassette housing, the primary latching element being formed by a projection on the wall of the bracket limb; and that the two secondary latching elements are formed by recesses in the side wall in the cassette housing facing the respective limb.

4. A combination as claimed in claim 3, characterized in that each of the bracket limbs has a wall facing the cassette housing, and a ridge extending along said limb wall; and each of the cassette housing side walls has a groove arranged for engagement with the ridge on the respective limb, whereby relative movement between the bracket and the cassette in a direction perpendicular to the cassette cover walls is prevented when the combination is in either said first or said second relative position.

5. A combination as claimed in claim 2, characterized in that each of the bracket limbs has a wall facing the cassette housing, and a ridge extending along said limb wall; and each of the cassette housing side walls has a groove arranged for engagement with the ridge on the respective limb, whereby relative movement between the bracket and the cassette in a direction perpendicular to the cassette cover walls is prevented when the combination is in either said first or said second relative position.

6. A combination as claimed in claim 2, characterized n that the bracket further comprises an index strip, disposed on a wall of the bracket which is free relative to the cassette housing, for making marks.

7. A combination as claimed in claim 2, characterized in that the bracket further comprises a plurality of code elements, forming an identification code, disposed on at least one wall which is free relative to the cassette housing, and at least one slide moveable along said wall for selecting a code element.

8. A combination as claimed in claim 7, characterized in that said at least one slide is U-shaped and has free ends enclosing the bracket; and the bracket includes a latching device for the slide providing a plurality of latching positions associated with individual ones of the code elements.

9. In combination, a cassette or a record carrier in the form of a tape, comprising a cassette housing having two cover walls, two side walls and a non-planar front wall having at least one opening therethrough, the record carrier tape passing along and being accessible through said opening,
- a U-shaped bracket comprising two limbs and one cross piece interconnecting said two limbs, arranged to be detachably connected to the cassette housing by engagement of said two limbs with the two side walls of the cassette housing, and
- retaining means acting between the cassette housing and the bracket for retaining the cassette housing and the bracket to each other,
- characterized in that the cassette housing and the bracket are arranged to be connectable to each other in a first position relative to each other, in which the front wall of the cassette housing is remote from the bracket cross piece, the cassette-bracket combination thereby being positionable in an apparatus by locating with respect to the bracket, at the same time that the front wall opening is accessible for scanning of the tape;
- the bracket cross piece has a wall facing the cassette housing shaped to be complementary to the non-planar shape of the front wall of the cassette housing, so arranged so said housing and bracket are connectable to each other in a second position in which the front wall of the housing faces the bracket cross piece and the bracket closes said at least one opening formed in the cassette housing front wall; and
- said retaining means comprise at least one double-latching device having primary and secondary latching elements arranged on the cassette housing and on the bracket, engageable with each other.

10. A combination as claimed in claim 9, characterized in that the bracket limb has a wall facing the cassette housing, the primary latching element being formed by a projection on the wall of the bracket limb; and that the two secondary latching elements are formed by recesses in the side wall in the cassette housing facing the respective limb.

11. A combination as claimed in claim 9, characterized in that the double-acting latching device is operable between a bracket limb and a cassette side wall, and comprises one primary latching element only on one of said housing and limb and two secondary latching elements on the other of said housing and limb, said secondary elements being spaced from each other a distance in accordance with the location of the primary latching element in the two relative positions of the bracket and cassette, and
- each of the bracket limbs has a wall facing the cassette housing, and a ridge extending along said limb wall; and each of the cassette housing side walls has a slot arranged for engagement with the ridge on the respective limb, whereby relative movement between the bracket and the cassette in a direction perpendicular to the cassette cover walls is prevented when the combination is in either said first or said second relative position.

12. A combination as claimed in claim 11, characterized in that the bracket further comprises an index strip, disposed on a wall of the bracket which is free relative to the cassette housing, for making marks.

13. A combination as claimed in claim 11, characterized in that the bracket further comprises a plurality of code elements, forming an identification code, disposed on at least one wall which is free relative to the cassette housing, and at least one slide moveable along said wall for selecting a code element.

* * * * *

UNITED STATES PATENT AND TRADEMARK OFFICE
CERTIFICATE OF CORRECTION

PATENT NO. : 4,413,732

DATED : November 8, 1983

INVENTOR(S) : Friedrich Louzil

It is certified that error appears in the above-identified patent and that said Letters Patent is hereby corrected as shown below:

Column 8, claim 6 line 2, "n that" should read -- in that --

Column 10, claim 9, lines 3-4, "double latching" should read -- double-acting latching --.

Signed and Sealed this

Third Day of July 1984

[SEAL]

Attest:

GERALD J. MOSSINGHOFF

Attesting Officer

Commissioner of Patents and Trademarks